US012668533B2

(12) United States Patent
Kang et al.

(10) Patent No.: US 12,668,533 B2
(45) Date of Patent: Jun. 30, 2026

(54) APPARATUS AND METHOD TO FORM ULTRAFINE FEATURES ON GLASS

(71) Applicant: Industry-Academic Cooperation Foundation, Yonsei University, Seoul (KR)

(72) Inventors: Shinill Kang, Seoul (KR); Runjia Han, Seoul (KR); Donghyun Kim, Seoul (KR); Sunmok Kwon, Seoul (KR); Jeehyeon Lee, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 355 days.

(21) Appl. No.: 18/301,020

(22) Filed: Apr. 14, 2023

(65) Prior Publication Data

US 2023/0357077 A1 Nov. 9, 2023

(30) Foreign Application Priority Data

Mar. 7, 2022 (KR) ........................ 10-2022-0028472

(51) Int. Cl.
*C03C 23/00* (2006.01)
(52) U.S. Cl.
CPC ........ *C03C 23/0025* (2013.01); *C03C 23/001* (2013.01)
(58) Field of Classification Search
CPC . C03C 23/0025; C03C 23/001; B81C 1/0046; H01L 21/00; H01L 23/13;
(Continued)

(56) References Cited

U.S. PATENT DOCUMENTS 6,482,742 B1 * 11/2002 Chou .................... B29C 43/021
264/293
6,900,881 B2 * 5/2005 Sreenivasan ........ B29C 35/0888
355/87
(Continued)

FOREIGN PATENT DOCUMENTS

EP 2239127 A1 10/2010
JP 2005353129 A 12/2005
(Continued)

OTHER PUBLICATIONS

Zawawi et. al. (NPL, Sep. 21, 2018, "Sustainable Fabrication of Glass Nanostructures Using Infrared Transparent Mold Assisted by CO2 Laser Scanning Irradiation", Jour. of Mfg. Sci. and Eng., Dec. 2018, pp. 121005 (9 pages), vol. 140 (12), The Amer. Soc. of Mech. Engrs, Seoul Korea. (Year: 2018).*

(Continued)

*Primary Examiner* — Alison L Hindenlang
*Assistant Examiner* — Christopher Paul Daigler
(74) *Attorney, Agent, or Firm* — DICKINSON WRIGHT PLLC

(57) ABSTRACT

The present invention relates to a method and apparatus for forming ultrafine features on a glass surface. The method and apparatus for forming ultrafine features on a glass surface are configured to directly pressurize a mold with a transmission unit or to pressurize the mold with a fluid using the transmission unit, so the mold may pressurize the glass surface with a uniform force.

3 Claims, 4 Drawing Sheets

2

(58) Field of Classification Search
CPC ....... H01L 23/15; C03B 11/00; B29C 59/022;
B29C 59/02; G03F 7/0002
See application file for complete search history.

(56) References Cited

U.S. PATENT DOCUMENTS

| | | | |
|---|---|---|---|
| 8,092,737 | B2 | 1/2012 | Chang et al. |
| 8,215,944 | B2 | 7/2012 | Takaya et al. |
| 9,950,463 | B2 | 4/2018 | Ishikawa et al. |
| 2008/0122138 | A1* | 5/2008 | Zhang .................. B29C 59/022 |
| | | | 425/149 |
| 2009/0194913 | A1 | 8/2009 | Chang et al. |
| 2011/0024948 | A1 | 2/2011 | Takaya et al. |
| 2012/0244245 | A1* | 9/2012 | Zhu ..................... C08G 59/245 |
| | | | 425/470 |
| 2014/0001675 | A1 | 1/2014 | Nakamura et al. |
| 2015/0064628 | A1* | 3/2015 | Guo ....................... B82Y 10/00 |
| | | | 430/319 |
| 2016/0257062 | A1 | 9/2016 | Ishikawa et al. |
| 2017/0282439 | A1* | 10/2017 | Lu ......................... B29C 59/002 |
| 2022/0161583 | A1 | 5/2022 | Choi et al. |
| 2023/0176475 | A1* | 6/2023 | Furst .................... B29C 59/022 |
| | | | 430/5 |

FOREIGN PATENT DOCUMENTS

| | | | |
|---|---|---|---|
| JP | 2006332391 | A | * 12/2006 |
| JP | 2008207970 | A | 9/2008 |
| JP | 2016162870 | A | 9/2016 |
| JP | 2018016507 | A | 2/2018 |
| KR | 20210013415 | A | 2/2021 |
| KR | 102244514 | B1 | 4/2021 |

OTHER PUBLICATIONS

Lee et. al. "A Hybrid Nano-Imprinting Lithography Based on Infrared Pulsed Laser Heating," 2006 1st IEEE International Conference on Nano/Micro Engineered and Molecular Systems, Zhuhai, China, 2006, pp. 6-10, doi: 10.1109/NEMS.2006.334591. (Year: 2006).*
Grigialiunas et. al. (NPL, "Nanoprint lithography using IR laser irradiation", Applied Surface Science vol. 253 (2) Feb. 13, 2006, pp. 646-650) Elsevier, Steyr Austria. (Year: 2006).*
JP2006332391A English Description Translation, Hiroshima, "Method and Device for Imprinting by Back Pressurization", Espacenet Nov. 13, 2025, Dec. 7, 2006 (Year: 2006).*
NPL "IR laser-assisted micro/nanoimprinting", Chen et. al, Journal of Micromechanics and MicroEngineering vol. 16, pp. 1463-1467, Year 2006 (Year: 2006).*
NPL "Fabrication of concave gratings by curved surface UV-nanoimprint lithography", Chen et. al., Journal of Vacuum Science and Technology B, vol. 26, pp. 1690-1695, Sep. 5, 2008, Year 2008 (Year: 2008).*

* cited by examiner

<u>2</u>

<u>2</u>

APPARATUS AND METHOD TO FORM ULTRAFINE FEATURES ON GLASS

CROSS-REFERENCE TO RELATED APPLICATIONS

This application claims the benefit of priority under 35 U.S.C. § 119 to Korean Patent Application No. 10-2022-0028472, filed Mar. 7, 2022, the contents of which are incorporated herein by reference in its entirety.

TECHNICAL FIELD

The following disclosure relates to method and apparatus for forming ultrafine features on a glass surface, and more particularly, to a method and apparatus for forming ultrafine features on a glass surface configured to pressurize the glass surface with a uniform force by including a transmission unit.

BACKGROUND

Glass has high physical durability and chemical durability, and has been treated as important in the industry because it may exhibit optical properties with particularly excellent performance.

When micro-nano structures (hereinafter, referred to as ultrafine features) are formed on glass surface, various functions may be imparted to the glass surface, and thus, many studies have been conducted to form ultrafine features on the glass surface.

There are various methods such as a photolithography method, a thermoforming method, and a direct processing method as a method for forming ultrafine features on a glass surface. However, the photolithography method has a problem in that the process is complicated and a lot of time is required to perform the process, and the thermoforming method has a problem that a thickness of the glass may be deformed when the glass is heated and pressure is applied. In addition, the direct processing method has a problem in that the time required for processing is long and the processing difficulty is high.

Meanwhile, as a method for forming ultrafine features on a glass surface, there is a method for pressurizing a mold having the ultrafine features to glass preheated by laser irradiation to transfer the ultrafine features of the mold to the glass.

The transfer method has the advantage of overcoming the problems of the photolithography method, the thermoforming method, and the direct processing method described above, but in pressurizing the glass surface with a flat mold, there is a problem in that it is difficult for the mold to pressurize the glass surface with a uniform force.

As such, when the glass surface is not uniformly pressurized by the mold, the ultrafine features formed in the mold are not effectively transferred to the glass surface, so the ultrafine features may not be accurately formed on the glass surface.

SUMMARY

An embodiment of the present invention is directed to providing a method and apparatus for forming ultrafine features on a glass surface capable of precisely forming ultrafine features on a glass surface.

Another embodiment of the present invention is directed to providing a method and apparatus for forming ultrafine features on a glass surface capable of rapidly forming ultrafine features on a glass surface having a large area.

Aspects of the present invention are not limited to the above-mentioned aspects. That is, other aspects that are not described may be obviously understood by those skilled in the art from the following specification.

In one general aspect, an apparatus for forming ultrafine features on a glass surface includes: a lower support part; glass that is disposed above the lower support part; a mold that is made of a transparent material covering an upper surface of the glass through which an infrared laser is transmitted; an inlet part that transports a fluid; an upper support part that has a hole formed to penetrate through upper and lower portions, seals the outer periphery of the upper surface of the mold so that the mold is under a lower portion of the hole, and is provided with a passage having one side communicating with the hole and the other side connected to the inlet part; a transmission unit that seals an upper portion of the hole and transmits an infrared laser; and a laser irradiation unit that irradiates an infrared laser to the upper portion of the transmission unit, in which, when the upper support part seals the outer periphery of the upper surface of the mold, the fluid transported from the inlet part passes through the passage and is introduced into the hole to pressurize the upper surface of the mold.

The lower support part may include a first heating unit that heats the lower support part, and the upper support part includes a second heating unit that heats the upper support part.

The fluid transported from the inlet part and introduced into the hole may be air.

The mold may be made of any one of silicon (Si), diamond, germanium (Ge), zinc selenide (ZnSe), zinc sulfide (ZnS), gallium arsenide (GaAs), sodium chloride (NaCl), gallium bromide (KBr), barium fluoride (BaF2), or thallium bromoiodide (KRS-5), and the transmission unit may be made of any one of silicon (Si), diamond, germanium (Ge), zinc selenide (ZnSe), zinc sulfide (ZnS), gallium arsenide (GaAs), sodium chloride (NaCl), gallium bromide (KBr), barium fluoride (BaF2), or thallium bromoiodide (KRS-5).

In another general aspect, an apparatus for forming ultrafine features on a glass surface includes: a lower support part; glass that is disposed above the lower support part; a mold that is made of a transparent material covering an upper surface of the glass through which an infrared laser is transmitted; a transmission unit that is made of a transparent material covering an upper surface of the mold through which an infrared laser is transmitted; an upper support part that is coupled to an outer periphery of the transmission unit to support the transmission unit; and a laser irradiation unit that irradiates an infrared laser to the upper portion of the transmission unit, in which the lower support part pressurizes the glass upward so that the upper surface of the glass is pressurized by the mold.

The lower support part may include a third heating unit that heats the lower support part, and the upper support part may include a fourth heating unit that heats the upper support part.

The transmission unit may be formed to be depressed upward.

The upper support part may protrude upward from the transmission unit so that a groove is formed between the upper support part and the upper outer periphery of the transmission unit, and a support member may be installed in the groove so that the upper support part pressurizes the upper outer periphery of the transmission unit.

The mold may be made of any one of silicon (Si), diamond, germanium (Ge), zinc selenide (ZnSe), zinc sulfide (ZnS), gallium arsenide (GaAs), sodium chloride (NaCl), gallium bromide (KBr), barium fluoride (BaF2), or thallium bromoiodide (KRS-5), and the transmission unit may be made of any one of silicon (Si), diamond, germanium (Ge), zinc selenide (ZnSe), zinc sulfide (ZnS), gallium arsenide (GaAs), sodium chloride (NaCl), gallium bromide (KBr), barium fluoride (BaF2), or thallium bromoiodide (KRS-5).

In still another general aspect, a method for forming ultrafine features on a glass surface includes: a first step of disposing glass above a lower support part; a second step of covering the glass surface with a mold made of a transparent material through which an infrared laser is transmitted; a third step of sealing an outer periphery of an upper surface of the mold with an upper support part that has a hole formed to penetrate through upper and lower portions, seals an outer periphery of an upper surface of the mold so that the mold is positioned under the hole, and is provided with a passage having one side communicating with the hole and the other side connected to the inlet part through which a fluid is transported; a fourth step of sealing an upper portion of the hole with a transmission unit through which the infrared laser is transmitted; a fifth step of pressurizing the upper surface of the mold by allowing a fluid transported from the inlet part to pass through the passage and the fluid to be introduced into the hole; and a sixth step of irradiating an infrared laser to an upper portion of the transmission unit.

Details of other embodiments for solving the problem are included in the description and drawings of the invention.

DETAILED DESCRIPTION OF EMBODIMENTS

Figure 1:
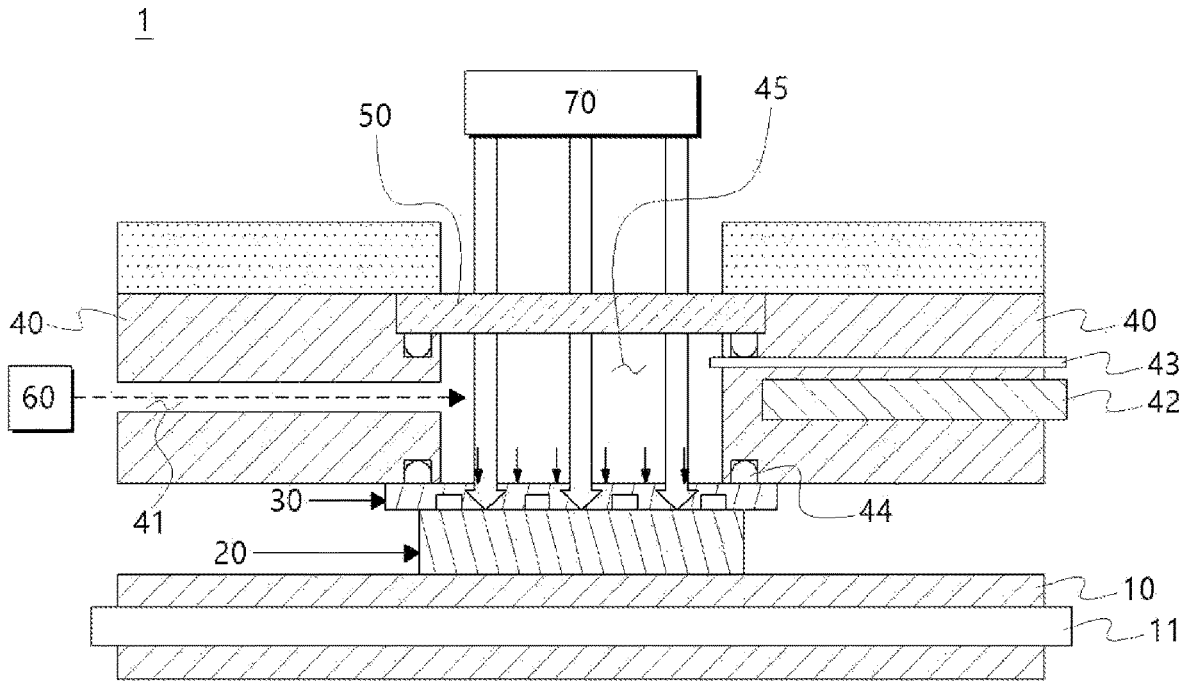
FIG. 1 is a diagram illustrating an apparatus for forming ultrafine features on a glass surface according to a first embodiment of the present invention.

Hereinafter, exemplary embodiments of the present disclosure will be described in detail with reference to the accompanying drawings so that those skilled in the art to which the present disclosure pertains may easily practice. However, the present disclosure may be implemented in various different forms, and is not limited to the embodiments described herein. In addition, in the drawings, portions unrelated to the description will be omitted to clearly describe the present disclosure, and similar portions will be denoted by similar reference numerals throughout the specification.

Throughout the present specification, when any one part is referred to as being "connected to" another part, it means that any one part and another part are "directly connected to" each other or are "electrically connected to" each other with still another part interposed therebetween.

Throughout the present specification, when any member is referred to as being positioned "on" other member, it includes not only a case in which any member and another member are in contact with each other, but also a case in which the other member is interposed between any member and another member.

Throughout the present specification, "including" any component will be understood to imply the inclusion of other components rather than the exclusion of other components, unless explicitly described to the contrary. The terms "about," "substantially," and the like used throughout the present specification means figures corresponding to manufacturing and material tolerances specific to the stated meaning and figures close thereto, and are used to prevent unconscionable abusers from unfairly using the disclosure of figures precisely or absolutely described to aid the understanding of the present disclosure. The term "~step" or "~step of" used throughout the present specification of the present invention does not mean "~step for."

Hereinafter, embodiments of the present invention will be described in detail with reference to the accompanying drawings. However, the present invention is not limited to exemplary embodiments herein, but may be implemented in other forms. Same reference numerals denote same constituent elements throughout the specification.

Hereinafter, an apparatus for forming ultrafine features on a glass surface according to a first embodiment of the present invention will be described.

FIG. 1 is a diagram illustrating an apparatus for forming ultrafine features on a glass surface according to a first embodiment of the present invention.

Referring to FIG. 1, the apparatus 1 for forming ultrafine features on a glass surface includes a lower support part 10, glass 20, a mold 30, an upper support part 40, a transmission unit 50, an inlet part 60, and a laser irradiation unit 70.

First, the lower support part 10 will be described.

An upper surface of the lower support part 10 may be formed flat to support the glass 20 thereon, and may be formed of metal such as iron.

In addition, a first heating unit 11 capable of heating the lower support part 10 may be installed inside the lower support part 10.

When the lower support part 10 is heated by the first heating unit 11, the glass 20 in contact with the lower support part 10 and the mold 30 in contact with the glass 20 may be preheated together to a temperature equal to or lower than a predetermined temperature.

In this way, if the glass 20 is preheated to a temperature equal to or lower than a predetermined temperature, when the surface of the glass 20 is heated by a laser irradiated from a laser irradiation unit 70 to be described later, a rapid increase in temperature of the surface of the glass 20 is prevented, so the glass may be prevented from being broken.

Next, the glass 20 will be described.

The glass 20 may be made of a conventional glass material, and an upper surface thereof may be pressurized by a mold 30 to be described later.

When the upper surface of the glass 20 is heated and then pressurized by the mold 30, the ultrafine features formed in the mold 30 are transferred to the glass 20, and the ultrafine features are formed on the upper surface of the glass 20.

Next, the mold 30 will be described.

The mold 30 may be configured so that the ultrafine features are formed on a surface that comes into contact with the upper surface of the glass 20, and the ultrafine features may be transferred to the glass 20 when the surface of the heated glass 20 is pressurized.

Also, the mold 30 may be made of a transparent material so that the infrared laser irradiated from the laser irradiation unit 70 may transmit therethrough.

For example, the mold 30 has the ultrafine features formed on one surface, and has a Knoop hardness of 1150 Kg/mm$^2$ and a thickness of 1 mm or more and 2 mm or less, and may be made of silicon (Si), diamond, germanium (Ge), zinc selenide (ZnSe), zinc sulfide (ZnS), gallium arsenide (GaAs), sodium chloride (NaCl), gallium bromide (KBr), barium fluoride (BaF$_2$), thallium bromoiodide (KRS-5), or the like.

Next, the upper support part 40 will be described.

The upper support part 40 can seal an outer periphery of the upper surface of the mold 30, but may be configured so that a laser emitted from the laser irradiation unit 70 to be described later may be irradiated toward the mold 30.

For example, as illustrated in FIG. 1, the upper support part 40 may be configured to have a hole 45 formed to penetrate through the upper and lower portions, and seal the outer periphery of the upper surface of the mold 30 so that the mold 30 is positioned under the hole 45.

In this case, the upper support part 40 may be configured to more reliably seal the outer periphery of the upper surface of the mold 30 by providing a gasket 44 at a portion in contact with the outer periphery of the upper surface of the mold 30.

Meanwhile, the upper support part 40 may be provided with a passage 41, and the upper support part 40 may include a second heating unit 42 and a pressure measuring unit 43.

The passage 41 may be formed so that one side communicates with the hole 45 and the other side is connected to the inlet part 60 to be described later, and a fluid may be introduced into the hole 45 through the passage 41.

The second heating unit 42 may serve to heat the upper support part 40, and when the upper support part 40 is heated by the second heating unit 42, the mold 30 in contact with the upper support part 40 and the glass 20 in contact with the mold 30 may be preheated together to a temperature equal to or lower than a predetermined temperature.

In this way, if the glass 20 is preheated to a temperature equal to or lower than a predetermined temperature, when the surface of the glass 20 is heated by a laser irradiated from a laser irradiation unit 70 to be described later, a rapid increase in temperature of the surface of the glass 20 is prevented, so the glass may be prevented from being broken.

The pressure measuring unit 43 may be formed of a conventional load cell or the like, and may serve to measure the pressure inside the hole 45.

Next, the transmission unit 50 will be described.

The transmission unit 50 may be configured to seal the upper portion of the hole 45 of the upper support part 40, and may be made of a transparent material so that the infrared laser irradiated from the laser irradiation unit 70 may transmit therethrough.

For example, the transmission unit 50 has a Knoop hardness of 120 Kg/mm$^2$ and a thickness of 10 mm, and may be made of silicon (Si), diamond, germanium (Ge), zinc selenide (ZnSe), zinc sulfide (ZnS), gallium arsenide (GaAs), sodium chloride (NaCl), gallium bromide (KBr), barium fluoride (BaF$_2$), thallium bromoiodide (KRS-5), or the like.

Next, the inlet part 60 will be described. The inlet part 60 may be formed of a conventional pump or the like capable of transporting a fluid, and one side is connected to the passage 41 so that the fluid may be transported to the passage 41.

The fluid transported by the inlet part 60 may include air, water, oil, etc., and the fluid transported by the inlet part 60 and introduced into the passage 41 is accommodated in the hole 45 inside the upper support part 40.

Meanwhile, since the lower portion of the hole 45 inside the upper support part 40 is sealed by the mold 30 and the upper portion is sealed by the transmission unit 50, the fluid introduced into the hole 45 pressurizes the upper surface of the mold 30 with a uniform force.

In this way, when the fluid introduced into the hole 45 pressurizes the upper surface of the mold 30 with a uniform force, the surface of the glass 20 is pressurized with a uniform force by the mold 30, so the ultrafine features formed in the mold 30 may be precisely transferred to the surface of the glass 20.

In this case, the pressure at which the fluid accommodated in the hole 45 pressurizes the upper surface of the mold 30 may be measured by the pressure measuring unit 43.

Next, the laser irradiation unit 70 will be described.

The laser irradiation unit 70 may be formed of a conventional laser irradiation mechanism capable of irradiating an infrared laser, and may be configured to irradiate the infrared laser to an upper portion of the transmission unit 50.

The infrared laser irradiated from the laser irradiation unit 70 to the upper portion of the transmission unit 50 passes through the transmission unit 50 and the fluid accommodated in the hole 45 and is irradiated to the mold 30, and the infrared laser irradiated to the mold 30 passes through the mold 30 and is irradiated to the glass 20. Since the surface of the glass 20 to which the infrared laser is irradiated is heated to a predetermined thickness, the ultrafine features of the mold 30 may be effectively transferred to the glass 20.

Hereinafter, an apparatus for forming ultrafine features on a glass surface according to a second embodiment of the present invention will be described.

Figure 2:
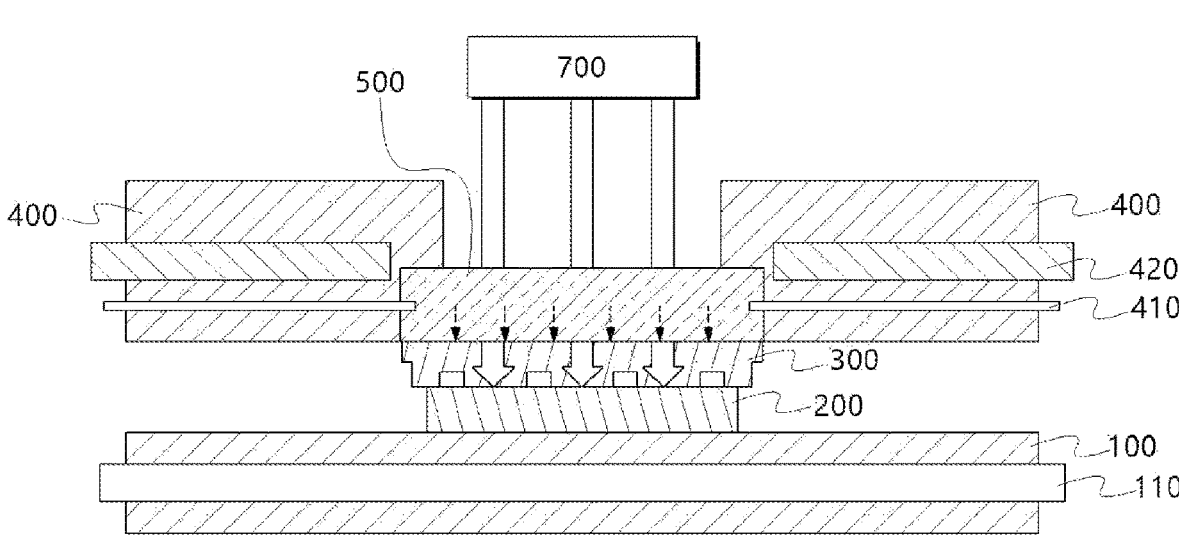
FIG. 2 is a diagram illustrating an apparatus for forming ultrafine features on a glass surface according to a second embodiment of the present invention.

FIG. 2 is a diagram illustrating an apparatus for forming ultrafine features on a glass surface according to a second embodiment of the present invention.

Referring to FIG. 2, the apparatus 2 for forming ultrafine features on a glass surface includes a lower support part 100, glass 200, a mold 300, an upper support part 400, a transmission unit 500, and a laser irradiation unit 700.

First, the lower support part 100 will be described.

An upper surface of the lower support part 100 may be formed flat to support the glass 200 thereon, and may be formed of metal such as iron.

In addition, a third heating unit 110 capable of heating the lower support part 100 may be installed inside the lower support part 100.

When the lower support part 100 is heated by the third heating unit 110, the glass 200 in contact with the lower support part 100 and the mold 300 in contact with the glass 200 may be preheated together to a temperature equal to or lower than a predetermined temperature.

In this way, if the glass 200 is preheated to a temperature equal to or lower than a predetermined temperature, when the surface of the glass 200 is heated by a laser irradiated from a laser irradiation unit 700 to be described later, a rapid increase in temperature of the surface of the glass 200 is prevented, so the glass may be prevented from being broken.

Meanwhile, the lower support part 100 may be configured to pressurize the glass 200 upward so that the upper surface of the glass 200 supported thereon is pressurized by the mold 300 to be described later.

Next, the glass 200 will be described.

The glass 200 may be made of a conventional glass material, and an upper surface thereof may be pressurized by a mold 300 to be described later.

When the upper surface of the glass 200 is heated and pressurized by the mold 300, the ultrafine features formed in the mold 300 are transferred to the glass 200, and the ultrafine features are formed on the upper surface of the glass 200.

Next, the mold 300 will be described.

The mold 300 may be configured so that the ultrafine features are formed on a surface that comes into contact with the upper surface of the glass 200, and the ultrafine features may be transferred to the glass 200 when the surface of the heated glass 200 is pressurized.

Also, the mold 300 may be made of a transparent material so that the infrared laser irradiated from the laser irradiation unit 700 may transmit therethrough.

For example, the mold 300 has the ultrafine features formed on one surface, and has a Knoop hardness of 1150 Kg/mm² and a thickness of 1 mm or more and 2 mm or less, and may be made of silicon (Si), diamond, germanium (Ge), zinc selenide (ZnSe), zinc sulfide (ZnS), gallium arsenide (GaAs), sodium chloride (NaCl), gallium bromide (KBr), barium fluoride (BaF₂), thallium bromoiodide (KRS-5), or the like.

Next, the transmission unit 500 will be described.

The transmission unit 500 may be configured to cover the upper surface of the mold 300, and may be made of a transparent material so that the infrared laser irradiated from the laser irradiation unit 700 may transmit therethrough.

For example, the transmission unit 500 has a Knoop hardness of 120 Kg/mm² and a thickness of 10 mm, and may be made of silicon (Si), diamond, germanium (Ge), zinc selenide (ZnSe), zinc sulfide (ZnS), gallium arsenide (GaAs), sodium chloride (NaCl), gallium bromide (KBr), barium fluoride (BaF₂), thallium bromoiodide (KRS-5), or the like.

Meanwhile, the transmission unit 500 may be formed to be depressed upward.

Figure 3:
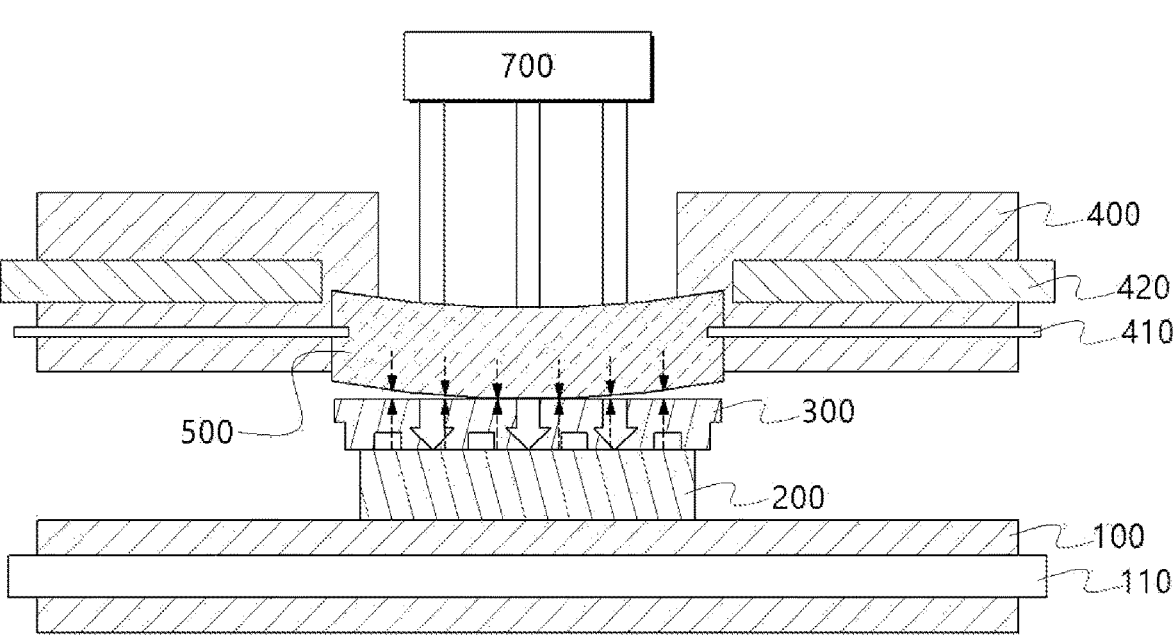
FIG. 3 is a diagram illustrating the apparatus for forming ultrafine features on a glass surface of FIG. 2 including a concave transmission unit.

FIG. 3 is a diagram illustrating the apparatus for forming ultrafine features on a glass surface of FIG. 2 including a concave transmission unit.

As illustrated in FIG. 3, when the transmission unit 500 is formed to be depressed upward, the transmission unit 500 is flattened during pressurizing the mold 300, so the upper surface of the mold 300 may be pressurized with a uniform force.

Next, the upper support part 400 will be described.

The upper support part 400 may be coupled to the outer periphery of the transmission unit 500 to support the transmission unit 500, and may include a coupling member 410 and a fourth heating unit 420.

The coupling member 410 may be formed of a conventional bolt or the like, and may be installed to penetrate through the upper support part 400 and the transmission unit 500 so that the upper support part 400 and the transmission unit 500 are firmly coupled to each other.

The fourth heating unit 420 may serve to heat the upper support part 400, and when the upper support part 400 is heated by the fourth heating unit 420, the mold 300 in contact with the upper support part 400 and the glass 200 in contact with the mold 300 may be preheated together to a temperature equal to or lower than a predetermined temperature.

In this way, if the glass 200 is preheated to a temperature equal to or lower than a predetermined temperature, when the surface of the glass 200 is heated by a laser irradiated from a laser irradiation unit 700 to be described later, a rapid increase in temperature of the surface of the glass 200 is prevented, so the glass may be prevented from being broken.

Meanwhile, a support member 430 may be installed between the upper support part 400 and the transmission unit 500.

Figure 4:
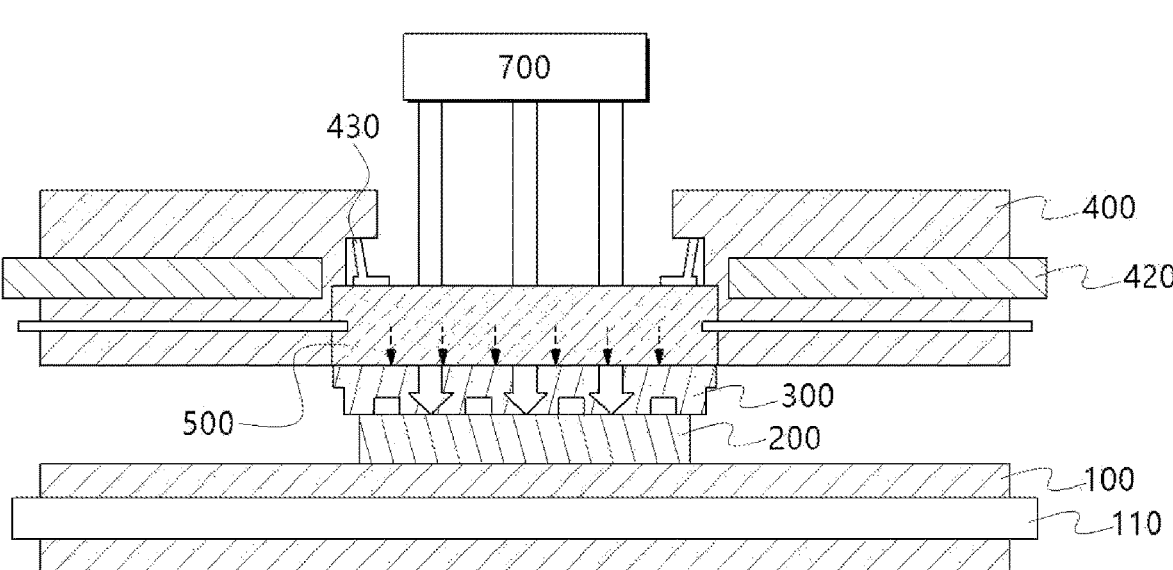
FIG. 4 is a diagram illustrating the apparatus for forming ultrafine features on a glass surface of FIG. 2 having a support member.

FIG. 4 is a diagram illustrating the apparatus for forming ultrafine features on a glass surface of FIG. 2 having a support member.

Referring to FIG. 4, the upper support part 400 may protrude upward from the transmission unit 500 so that a groove is formed between the upper support part 400 and the upper outer periphery of the transmission unit 500.

Also, the support member 430 may be installed in the groove so that the upper support part 400 pressurizes the upper outer periphery of the transmission unit 500.

As such, since the support member 430 is installed between the upper support part 400 and the transmission unit 500, bending of the transmission unit 500 can be prevented during the transmission unit 500 pressurizing the mold 300.

Next, the laser irradiation unit 700 will be described.

The laser irradiation unit 700 may be formed of a conventional laser irradiation mechanism capable of irradiating an infrared laser, and may be configured to irradiate the infrared laser to an upper portion of the transmission unit 500.

The infrared laser irradiated from the laser irradiation unit 700 to the upper portion of the transmission unit 500 passes through the transmission unit 500 and is irradiated to the mold 300, and the infrared laser irradiated to the mold 300 passes through the mold 300 and is irradiated to the glass 200. Since the surface of the glass 200 to which the infrared laser is irradiated is heated to a predetermined thickness, the ultrafine features of the mold 300 may be effectively transferred to the glass 200.

Hereinafter, a method for forming ultrafine features on a glass surface according to an embodiment of the present invention will be described.

The method for forming ultrafine features on a glass surface may include a first step (S100), a second step (S200), a third step (S300), a fourth step (S400), a fifth step (S500), and a sixth step (S600).

First, the first step (S100) will be described.

The first step (S100) is a step of disposing the glass 20 above the upper portion of the lower support part 10.

Since the configurations of the lower support part 10 and the glass 20 are the same as those of the lower support part 10 and the glass 20 described in the above-described apparatus 1 for forming ultrafine features on a glass surface, the following description will be omitted.

Next, the second step (S200) will be described.

The second step (S200) is a step of covering the surface of the glass 20 with the mold 30.

Specifically, the second step (S200) is a step of covering the surface of the glass 20 with the mold 30 made of a transparent material through which an infrared laser is transmitted, and since the configuration of the mold 30 is the same as that of the mold 30 described in the above-described apparatus 1 for forming ultrafine features on a glass surface, the following description will be omitted.

Next, the third step (S300) will be described.

The third step (S300) is a step of sealing the outer periphery of the upper surface of the mold 30 with the upper support part 40.

Specifically, the third step (S300) is a step of sealing the outer periphery of the upper surface of the mold 30 with the upper support part 40 that has the hole 45 formed to penetrate through the upper and lower portions, seals an outer periphery of the upper surface of the mold 30 so that the mold 30 is positioned under the hole 45, and is provided with the passage 41 having one side communicating with the hole 45 and the other side connected to the inlet part 60, and since the configurations of the upper support part 40, the passage 41, and the inlet part 60 are the same as that of the upper support part 40 described in the above-described apparatus 1 for forming ultrafine features on a glass surface, the following description will be omitted.

Next, the fourth step (S400) will be described.

The fourth step (S400) is a step of sealing the upper portion of the hole 45 with the transmission unit 50.

Specifically, the fourth step (S400) is a step of sealing the hole 45 formed in the upper support part 40 with the transmission unit 50 through which the infrared laser is transmitted, and since the configuration of the transmission unit 50 is the same as that of the transmission unit 50 described in the above-described apparatus 1 for forming ultrafine features on a glass surface, the following description will be omitted.

Next, the fifth step (S500) will be described.

The fifth step (S500) is a step of introducing a fluid into the hole 45 and pressurizing the upper surface of the mold 30.

Specifically, the fifth step (S500) is a step in which the fluid transported from the inlet part 60 passes through the passage 41 and is introduced into the hole 45 to pressurize the upper surface of the mold 30.

Next, the sixth step (S600) will be described.

The sixth step (S600) is a step of irradiating an infrared laser onto the transmission unit 50.

In this way, when the infrared laser is irradiated onto the transmission unit 50, the infrared laser passes through the transmission unit 50 and the fluid accommodated in the hole 45 and is irradiated to the mold 30, and the infrared laser irradiated to the mold 30 passes through the mold 30 and is irradiated to the glass 20. Since the surface of the glass 20 to which the infrared laser is irradiated is heated to a predetermined thickness, the ultrafine features of the mold 30 may be effectively transferred to the glass 20.

Hereinafter, the action and effect of the method and apparatus for forming ultrafine features on a glass surface of the present invention will be described.

First, the operation of the apparatus 1 for forming ultrafine features on a glass surface and the method for forming glass surface ultrafine features will be described.

The outer circumferential surface of the mold 30 disposed on the upper surface of the glass 20 is sealed by the upper support part 40.

In this case, the mold 30 is disposed to cover the upper surface of the glass 20, and the glass 20 is disposed above the lower support part 10.

The fluid is introduced into the hole 45 through the passage formed in the upper support part 40. Since the upper portion of the hole 45 formed in the upper support part 40 is sealed by the transmission unit 50, the fluid introduced into the hole 45 pressurizes the upper surface of the mold 30 with a uniform force.

Next, when the infrared laser is irradiated onto the transmission unit 50 through the laser irradiation unit 70, the infrared laser passes through the transmission unit 50 and the mold 30 and is irradiated to the glass 20. The surface of the glass 20 is heated by being irradiated with the infrared laser, and since the mold 30 pressurizes the upper surface of the glass 20 with a uniform force, the ultrafine features formed in the mold 30 are precisely transferred to the glass 20.

Next, the operation of the apparatus 2 for forming ultrafine features on a glass surface will be described.

The mold 300 is disposed on the upper surface of the glass 200 disposed above the lower support part 100. The upper surface of the mold 300 is covered with the transmission unit 500 coupled to the upper support part 400.

Next, the glass 200 is pressurized upward by the lower support part 100 so that the upper surface of the glass 200 is pressurized by the mold 300.

When the glass 200 is pressurized upward, the lower portion of the mold 300 is pressurized by the glass 200 and the upper portion is pressurized with a uniform force by the transmission unit 500, so the ultrafine features formed in the mold 300 are precisely transferred to the glass 200.

As described above, the method and apparatus for forming ultrafine features on a glass surface according to the present invention are configured so that a mold pressurizes the glass surface with a uniform force by including a transmission unit, thereby precisely forming the ultrafine features on the glass surface.

In addition, since a transfer process is performed by irradiating a laser to heat glass surface, it is possible to quickly form ultrafine features on the glass surface having a large area.

According to the solution to the problem of the present invention described above, the method and apparatus for forming ultrafine features on a glass surface according to the present invention are configured so that a mold pressurizes the glass surface with a uniform force by including a transmission unit, thereby precisely forming the ultrafine features on the glass surface.

In addition, since a transfer process is performed by irradiating a laser to heat glass surface, it is possible to quickly form ultrafine features on the glass surface having a large area.

The above description of the present invention is for illustrative purposes, and those skilled in the art to which the present invention pertains will understand that it may be easily modified to other specific forms without changing the technical spirit or essential features of the present invention. Therefore, it should be understood that the above-mentioned exemplary embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-described description and all modifications and alternations derived from the claims and their equivalents are included in the scope of the present invention.

What is claimed is:

1. An apparatus forming ultrafine features on a glass surface, the apparatus comprising:

a lower support part;

a glass that is disposed above the lower support part;

a mold that is made of a transparent material covering an upper surface of the glass through which an infrared laser is transmitted;

a transmission unit that is made of a transparent material covering an upper surface of the mold through which an infrared laser is transmitted;

an upper support part that is coupled to an outer periphery of the transmission unit to support the transmission unit; and a laser irradiation unit that irradiates an infrared laser to an upper portion of the transmission unit, wherein the lower support part pressurizes the glass upward so that the upper surface of the glass is pressurized by the mold, wherein the lower support part includes a third heating unit that heats the lower support part, and the upper support part includes a fourth heating unit that heats the upper support part, and wherein the transmission unit is formed to be depressed upward so that the transmission unit is flattened during pressurizing the mold, so the upper surface of the mold is pressurized with a uniform force.

2. The apparatus of claim 1, wherein the upper support part protrudes upward from the transmission unit so that a groove is formed between the upper support part and the upper outer periphery of the transmission unit, and a support member is installed in the groove so that the upper support part pressurizes the upper outer periphery of the transmission unit.

3. The apparatus of claim 1, wherein the mold is made of any one of silicon (Si), diamond, germanium (Ge), zinc selenide (ZnSe), zinc sulfide (ZnS), gallium arsenide (GaAs), sodium chloride (NaCl), gallium bromide (KBr), barium fluoride (BaF2), or thallium bromoiodide (KRS-5), and the transmission unit is made of any one of silicon (Si), diamond, germanium (Ge), zinc selenide (ZnSe), zinc sulfide (ZnS), gallium arsenide (GaAs), sodium chloride (NaCl), gallium bromide (KBr), barium fluoride (BaF2), or thallium bromoiodide (KRS-5).

* * * * *